(12) United States Patent
Sala et al.

(10) Patent No.: US 8,725,910 B1
(45) Date of Patent: May 13, 2014

(54) CABLE CONNECTION DETECTION FOR ELECTRONIC DEVICES

(75) Inventors: Leonardo Sala, Cornaredo (IT);
Kenneth Jay Helfrich, Duluth, GA (US)

(73) Assignee: Maxim Integrated Products, Inc, San Jose, CA (US)

( * ) Notice: Subject to any disclaimer, the term of this patent is extended or adjusted under 35 U.S.C. 154(b) by 113 days.

(21) Appl. No.: 13/206,255

(22) Filed: Aug. 9, 2011

(51) Int. Cl.
*G06F 3/00* (2006.01)
*G06F 13/40* (2006.01)

(52) U.S. Cl.
CPC ........ *G06F 13/4081* (2013.01); *G06F 13/4086* (2013.01); *G06F 13/4077* (2013.01)
USPC ............................................. 710/17; 710/15

(58) Field of Classification Search
CPC ............ G06F 13/4081; G06F 13/4086; G06F 13/4077
USPC ......................................................... 710/17
See application file for complete search history.

(56) References Cited

U.S. PATENT DOCUMENTS

| | | | | |
|---|---|---|---|---|
| 5,589,802 | A * | 12/1996 | O'Shaughnessy et al. | 331/44 |
| 7,603,486 | B2 * | 10/2009 | Le et al. | 710/7 |
| 7,886,081 | B2 * | 2/2011 | Akahane | 710/15 |
| 2011/0055615 | A1 * | 3/2011 | Kubo et al. | 713/340 |
| 2012/0026018 | A1 * | 2/2012 | Lin | 341/26 |
| 2012/0105051 | A1 * | 5/2012 | Furtner | 324/123 R |
| 2012/0194955 | A1 * | 8/2012 | Billingsley et al. | 361/91.1 |

* cited by examiner

*Primary Examiner* — Ernest Unelus
(74) *Attorney, Agent, or Firm* — TIPS Group

(57) ABSTRACT

A cable detection circuit for a device, set forth by way of example and not limitation, includes a generator circuit operative to provide currents on a line of a communication interface. A controller is coupled to the generator circuit and operative to detect an amount of capacitance on the line based on the provided currents. The controller is operative provide an output based on the detected amount of capacitance, the output indicating whether a cable is connected to the device via the communication interface.

20 Claims, 13 Drawing Sheets

CABLE CONNECTION DETECTION FOR ELECTRONIC DEVICES

BACKGROUND

Digital communication interfaces have become widespread with modern technology's emphasis on rapid transfer and communication of digital data for an ever-increasing amount of important functions, including data storage, output transmission, and device control. These interfaces include standard communication specifications such as Universal Serial Bus (USB), Serial Advanced Technology Attachment (SATA), Firewire, etc. These interfaces are used in a number of applications for computers and other electronic devices.

USB, for example, is a commonly-used interface standard that allows data communication between a host and one or more peripheral devices. The host controller communicates with the peripheral devices using one or more USB ports of the host connected to the peripherals.

Some functions of USB-compatible devices may vary or be altered based on whether the device is connected to a host computer or whether the device has a cable currently connected to one of its ports. For example, blood glucose measurements are often performed by users for monitoring the health status of themselves or others with respect to blood glucose level. These measurements are commonly taken utilizing a blood glucose meter device that can be connected to a computer with which the meter can communicate data, where the connection is by a USB cable. In some such devices, measured readings can be sent to the computer and/or configuration information can be received at the device from the computer over the USB cable. These devices are intended to be disconnected from the computer and the USB cable before they are used to take blood glucose measurements.

One problem with such blood glucose meter devices is that when blood glucose measurements are taken with a USB cable still connected to the device, the measurements may be inaccurate due to the electrical and/or magnetic effects of the cable on the measurements. These effects are present whether a computer is or is not connected to the opposite end of the cable. Since many users do not know, or forget, to disconnect the cable before taking measurements with the device, a significant number of measurements taken by users may therefore be inaccurate. Such inaccuracies in some cases may be quite harmful to the patient if, for example, a serious or life-threatening health condition is not detected due to inaccurate measurements, and/or a doctor cannot interpret accurate data from a patient. Other types of devices may similarly be intended to be disconnected from the interface cable and may have undesired performance or functions when a cable remains connected during their use.

There are some existing approaches to detecting a USB cable connection to a blood glucose meter device. In one approach, the device tries to detect the presence of a connected USB host, such as the computer, via the presence of pull-down resistors on the D+/D− signals of the USB interface. In another approach, detection of the USB cable shield terminal connection to ground is attempted in the computer or charger device in the peripheral device. However, neither the pull-down resistor connection nor shield connection to ground is mandated when the voltage on the USB bus is missing and thus detection of cable and computer is unreliable. These methods also fail to detect a cable that is connected to the meter device while not being connected to a computer or other device on the other end of the cable.

These and other limitations of the prior art will become apparent to those of skill in the art upon a reading of the following descriptions and a study of the several figures of the drawing.

SUMMARY

A cable detection circuit for a device, set forth by way of example and not limitation, includes a generator circuit operative to provide currents on a line of a communication interface. A controller is coupled to the generator circuit and operative to detect an amount of capacitance on the line based on the provided currents. The controller is operative provide an output based on the detected amount of capacitance, the output indicating whether a cable is connected to the device via the communication interface. In some examples, a disconnection circuit disconnects one or more external capacitors connected to the line prior to the providing of currents, and a discharge circuit discharges a residual voltage from the line before the generator circuit provides the currents.

In a method for detecting a cable connected to a device, set forth by way of example and not limitation, currents are provided on a line of a communication interface. An amount of capacitance is detected on the line based on the provided currents. An output is provided based on the detected amount of capacitance, the output indicating whether a cable is connected to the device via the communication interface.

In another method for detecting a cable connected to a device, set forth by way of example and not limitation, an external capacitor is disconnected from a line of a communication interface, the line operative to provide power to the device. The external capacitor is connected at a communication port of the device, the communication port facilitating communication between the device and the communication interface. An amount of capacitance is detected on the line after the disconnecting of the external capacitor. An output is provided based on the detected amount of capacitance, the output indicating whether a cable is connected to the device via the communication interface.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTIONS

In the following descriptions, interface components will be discussed with reference to the specific examples such as the USB interface standard. These examples are not to be seen as limiting but, rather, illustrative of the general concepts set forth herein.

Figure 1:
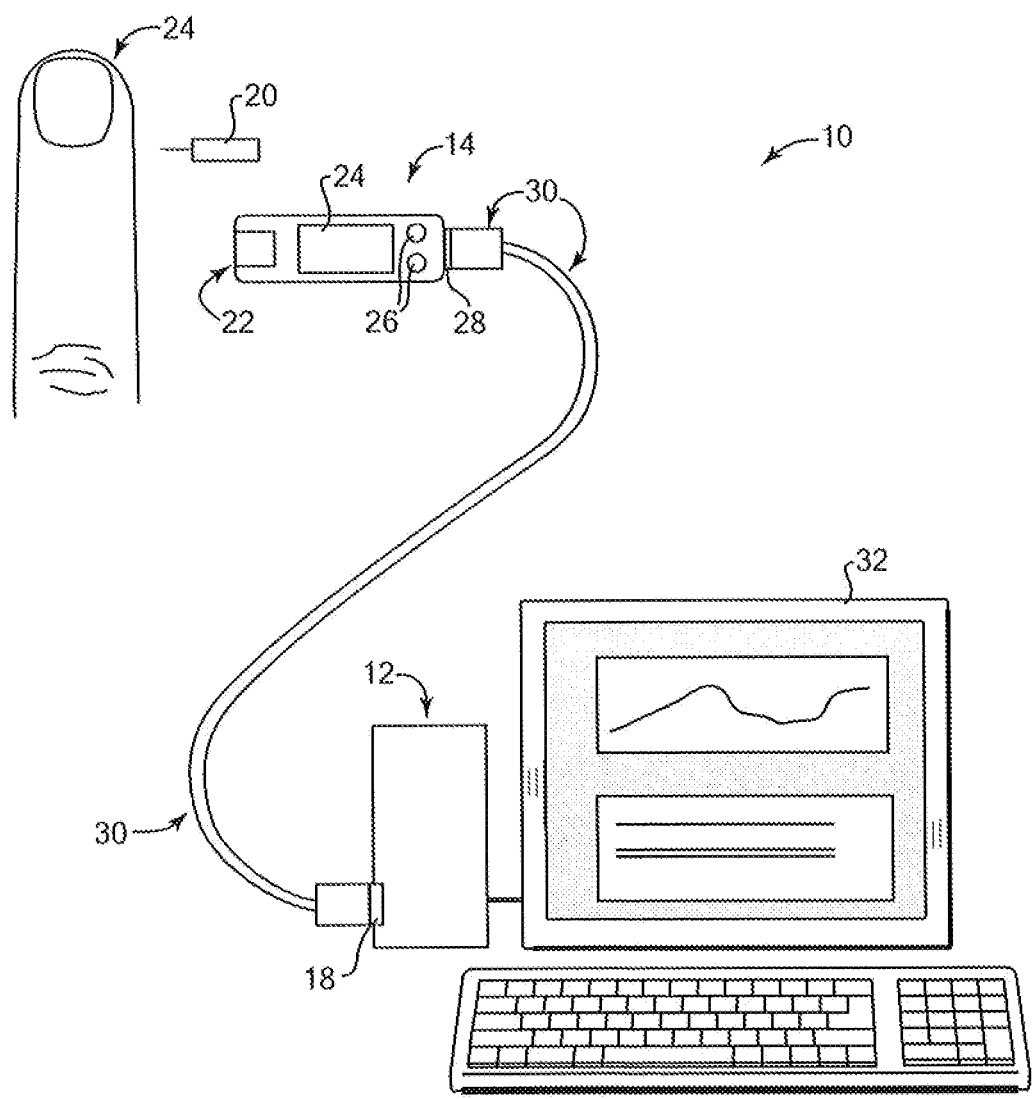
FIG. 1 is a block diagram of an example system suitable for use with one or more features or embodiments described herein.

FIG. 1 is a block diagram of an example system 10 suitable for use with one or more features or embodiments described herein. System 10 includes "devices" such as a host 12 and one or more peripheral devices 14 which communicate with each other using a standard communication interface.

Host 12 includes a host controller that directs communication of information (such as commands and data) over the standardized communication interface to and from other devices on the interface. The standardized communication interface can be USB in the examples described herein. Other standardized communication interfaces can be used in other embodiments, which include similar functionality.

The host 12 provides one or more host ports 18 which allow connection of and communication with peripheral device(s) 14 to the host 12 via the communication interface. One or more peripheral devices 14 can each be connected directly to a port 18 for communication with host 12, or in some embodiments one or more hubs can be connected between host 12 and peripheral 14 to allow communication of host 12 and peripheral 14 through the hub(s). In some examples, host 12 can be a desktop computer, laptop computer, workstation, server, set-top box, video game console, television or other home electronics unit, cell phone, tablet, or other electronic device communicating with one or more peripherals over the interface.

Peripheral device 14 can be any of several types of devices. In several of the examples described herein, device 14 is a blood glucose meter. This meter device is used to determine the approximate concentration of glucose in a user's blood. The meter allows users to perform blood glucose monitoring at home to monitor such health conditions as diabetes or hypoglycemia. Typically, a pin 20 is used to prick the user's skin (the pin 20 may be part of the device 14 or separate), such as at a finger 19 or other body part, and cause blood to emerge from the skin. The blood is placed on a test strip or disc that is placed in the meter for testing, such as in a slot 22 of the device 14. The meter 14 reads the blood on the test strip and calculates a blood glucose level. The meter 14 typically displays the glucose level on a display 24 of the meter 14, and control buttons 26 allow the user to set preferences and control other functions of the meter.

The glucose meter 14 may also includes a communications port 28 which allows the meter 14 to be connected to and communicate with the host 12 over the communication interface. The meter 14 is connected to the host 12 by a cable 30. The cable 30 can be any physical hop such as a wire or other physical connections, all referred to as "cables" herein. In the example shown, the communications port 28 is a USB port that connects with a USB cable 30, which is connected to host 12 at host USB port 18 at the other end of the cable 30. Cable 30 can include a connector at each end to plug into the ports 28 and 18 on the meter 14 and host 12, respectively. Various data and commands can be communicated over the interface, including recorded test data provided from the meter 14 to the host 12. The host 12 can in some embodiments collect test data over time and display the data in various configurations on a display 32 as desired by a user. In addition, configuration commands, updates, and preferences can be sent to the meter 14 from the host 12 to be stored in memory of meter 14. In addition, in some embodiments the meter 14 can receive power from the host 12 over the cable 30 to recharge one or more batteries provided in the meter 14 and/or power the operation or one or more components of the device 14.

In other embodiments, a connector adaptor can be inserted into the meter port 28 and the meter 14 can then be connected to the host port 18 of host 12 without the cable 30. Other embodiments may have such an adaptor built-in to the meter port 28. As referred to herein, the term "cable" refers to both a cable and its connectors, or to such a connector adaptor.

In many embodiments of the blood glucose meter 14, the user is required to disconnect the meter 14 from the host 12 and from the cable 30 before starting the glucose testing of blood samples using the meter 14. This is because measurements taken while the meter is connected to the cable and host, or connected to just the cable (i.e., the other end of the cable is floating), may be inaccurate due to the electrical and/or magnetic effects of the cable and/or host on the measurements made by the meter 14. Inaccuracies may be present regardless of whether a computer is or is not connected to the opposite end of the cable, or is powered on or off. Embodiments and features described herein allow the meter 14 to detect whether the cable 30 is connected. Once the cable is detected, the device 14 can warn the user of the connection via the display 24 or by sending the warning to the host 12 for the host to output. In some embodiments, the device 14 can disable some or all of its functions while a cable is determined to be connected.

Peripheral device 14 can be other types of devices in other embodiments. For example, the device 14 can include devices such as other measurement devices or meters, printers, scanners, hard drives or other storage drives, optical disk drives, cameras, visual display devices, audio output devices, data conversion devices, user interface controllers, game controllers, computers (such as any of the types of host 12 devices described above), portable phones, flash memory drives, network transmitters and/or receivers, or any device communicating with a host. Particular types of devices may be intended to be disconnected from an interface cable such as cable 30 and may have altered and/or undesired performance or functions when a cable and/or other device remains connected during particular uses, thus benefiting from the cable detection features described herein to indicate connection or disconnection to a user and/or to disable particular device functions while a cable is connected or disconnected.

In other embodiments, the peripheral device 14 can instead be designated the host on the communication interface. In some such embodiments, the host 12 can be a peripheral device or another host device. In other embodiments, the host 12 can include a cable detection system as described herein.

Figure 2:
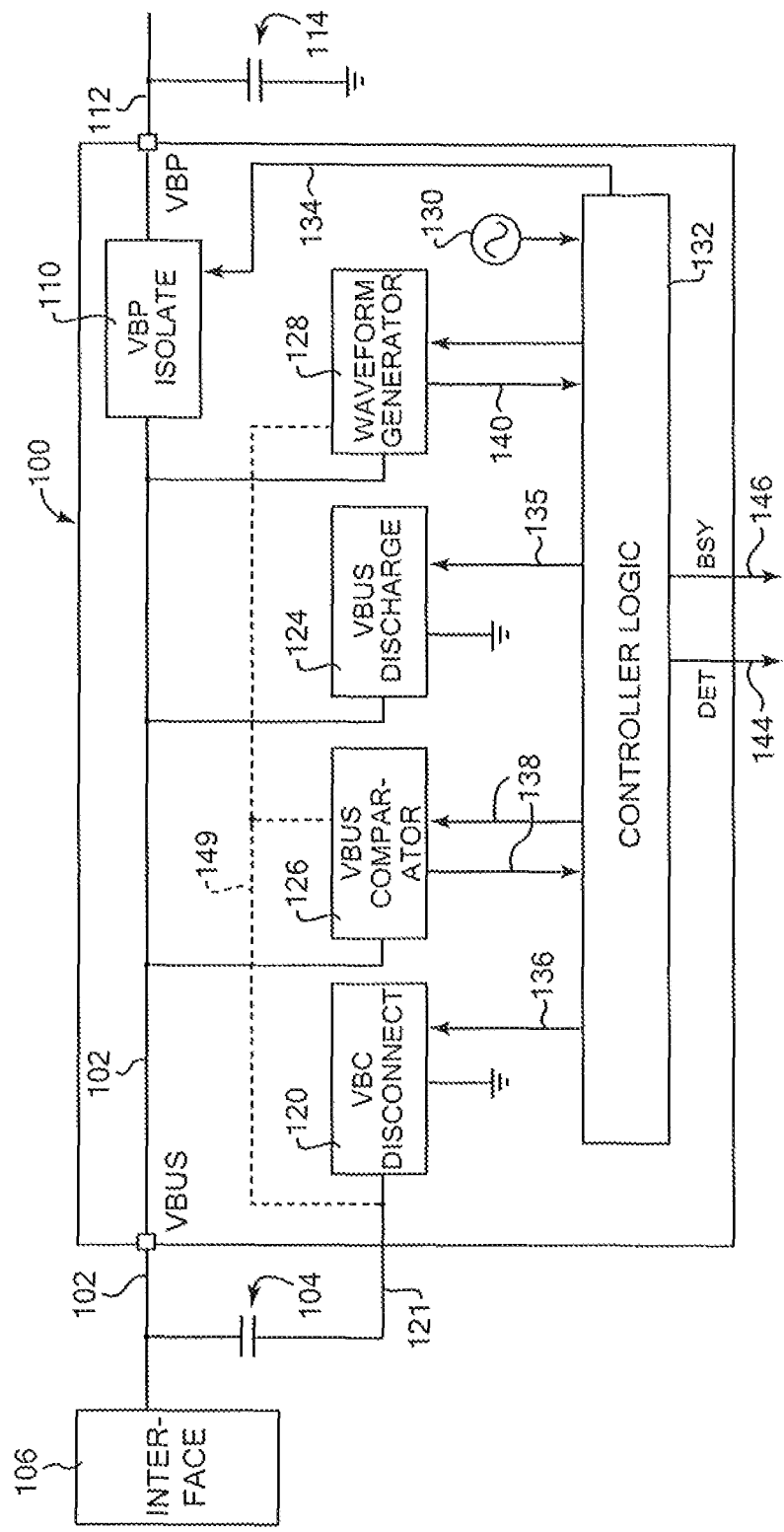
FIG. 2 is a block diagram of one example of a cable detection system.

FIG. 2 is a block diagram illustrating one example of a cable detection system 100. Detection system 100 can be included in a device of a system including a communication interface, such as device 14 of FIG. 1. For example, the cable detection system 100 can be provided in a blood glucose meter or other type of peripheral device as described above. In other embodiments, the detection system 100 can be included in a host or similar device.

The system 100 can include a VBUS input 102. In some communication interface standards, a line of the interface can provide power from a host to a peripheral device. For example, in the USB interface, the VBUS line is 5 volts at the source and provides power, while a GND line (not shown) provides a ground and D+ and D− signal lines (not shown) communicate data. In other interface standards, an appropriate power line can be used. Other embodiments can be connected to a non-powered line of the communication interface.

The VBUS line is coupled to an external capacitor 104 and to the communication interface 106. The external capacitor 104 is coupled in parallel to the VBUS line at the communication interface port of the device 14, external to system 100.

The capacitor 104 has another terminal coupled to a VBC input line 121 to the system 100. The capacitor 104 can be a discrete capacitor which may be required by the communication interface standard. In the USB standard, for example, the capacitance of capacitor 104 is required by the standard, e.g., 1 uF. Other interface embodiments may have different external capacitors.

System 100 can include a VBP isolate block 110 connected between the VBUS line 102 and a VBP line 112. VBP line 112 is connected to a component node which is connected to an external capacitor 114 as well as other components of the device 14 that receive the power on the VBUS line, such as a device controller (microprocessor or other integrated circuit), other circuits, batteries or other power source, etc. VBP isolate block 110 performs system load isolation by disconnecting the VBUS from the VBP line, i.e., disconnecting the external capacitance on the VBP line 112 from the rest of the system 100. The isolate block 110 also disconnects possible leakage current sources or component blocks that are connected to the VBP line 112 and that may draw current from or apply voltage to the VBUS during cable detection test measurements. In some embodiments, the VBP isolate block 110 can include additional functions, such as undervoltage lockout (UVLO) and overvoltage protection (OVP) (e.g., for a power source such as a battery connected to VBP line 112), provide thermal protection, act as a low-dropout regulator (LDO) for the VBP line 112, and/or route power to a battery charger connected to VBP line 112. In other embodiments, the VBP isolate block 110 is not used, such as for devices not using a communication standard having a power line, for systems allowing disconnection or disabling of components connected to the power line, for systems not using a power line to monitor cable connection, etc.

A VBC disconnect block 120 can be connected to VBC line 121 which is connected to the external capacitor 104. Block 120 can be used to disconnect the external capacitor 104 from ground, which effectively disconnects the capacitor 104 from the VBUS line 102 to allow the testing for the detection of a cable connection. For example, the removal of the capacitor 104 allows currents to be provided on the VBUS line without the capacitance of capacitor 104 affecting the testing of the line for capacitance contributed by a connected cable and host. Since small amounts of capacitance may need to be measured for cable detection, the much larger capacitance contributed to an external capacitor (or other external component) can overwhelm such measurements.

A VBUS discharge block 124 can be connected to the VBUS line 102. The discharge block 124 can be used to discharge the VBUS line 102 to remove any residual voltage on the VBUS line before performing tests to detect connection of a cable on that line. The removal of residual voltage allows voltages to be generated and measured on the line 102 without interference caused by residual voltage that may cause inaccuracies in measurements. The VBUS discharge block 124 can be connected to ground to allow the discharging of the VBUS line 124.

VBUS comparator(s) 126 can be included to the VBUS line 102 to determine whether any voltage exists on that line before starting the cable detection test measurement on the VBUS line. For example, the presence of a steady voltage after discharge can indicate that a cable is connected and the host is providing a voltage on the VBUS line, thus providing a simpler and faster way to detect cable connection and allowing the full measurement test to be avoided. The comparators 126 can check the voltage on the VBUS line 102 periodically or a predetermined number of times for each cable test measurement test, before the remainder of the test is performed.

A waveform generator 128 can be provided to generate the test waveforms used to test the capacitance on the VBUS line for cable detection. In some embodiments, the waveform generator 128 is a ramp generator that causes a voltage ramp waveform to be generated on the VBUS line in the presence of capacitance on that line. Other embodiments can generate other types of waveforms, such as triangle waveforms or any periodic waveform. The generator 128 generates the voltage waveform on the VBUS line 102 by injecting and sinking periodic constant currents on the VBUS line 102 that generate voltage ramps if enough capacitance is present on the line. The slope of the ramp is affected by the amount of capacitance, with a greater amount of capacitance causing a smaller slope or slower ramp. Based on the number of external cycles generated on VBUS in a given timeframe, a conclusion can be drawn as to whether a cable is connected to the VBUS line. For example, a number of ramp waveform cycles generated within a predetermined period of time can be counted and compared to a predetermined threshold value indicating whether a cable is connected or not.

An oscillator 130 can be used to generate a timeframe relatively precisely within which to count the number of generated ramps. For example, this timeframe can be used by the controller logic block 132 in its control of the waveform generator 128.

A controller logic block 132 can be included to control the operation of the cable detection system 100. The logic block 132 can coordinate the activities of the other blocks, including disconnecting external capacitors and any blocks during the cable test procedure which might draw current and interfere with the test procedure (thus allowing accurate measurements), starting and controlling the waveform generation during the test, counting ramps and comparing results, and outputting the outcome of the cable detection test to storage or other components or devices. For example, the logic block 132 can be a finite state machine (FSM) or other processor, logic, or circuitry. In some embodiments, the logic block 132 can generate a control signal 134 to control the isolate block 110, a control signal 135 to control the VBUS discharge block 124, and a control signal 136 to control the VBC disconnect block 120. The logic block 132 can also send and receive control signals 138 to control the VBUS comparators 126 and receive the result of a voltage measurement, can send signals 140 to control the waveform generator 128 for the cable test measurement (e.g., control the waveform output and receive the state of the waveform). The logic block 132 can also communicate signals with other components of the device 14, such as a microcontroller in the device 14. For example, a DET signal 144 can be used to indicate whether or not a cable connection has been detected. The BSY signal 146 can be used, for example, to indicate the status of whether a cable detection mode is currently running or not on the system 100. Other embodiments can use additional and/or different status signals to indicate or command various statuses or modes of the system 100 and cable detection procedure.

In some other embodiments, many of the components of the cable detection system 100 can be connected to the VBC line 121 instead of the VBUS line 102. If the VBC line 121 is disconnected from ground (as performed by VBC disconnect block 120), a component connecting to the VBC line 121 is functionally equivalent to a connection to the VBUS line 104 for several of the functions and purposes described. Thus, for example, as shown by the dashed line connection 149, the VBUS comparator 126 and the waveform generator 128 can be connected to the VBC line 121 instead of the VBUS line 102, to measure voltage and generate a waveform on the VBUS line 102.

Figure 3:
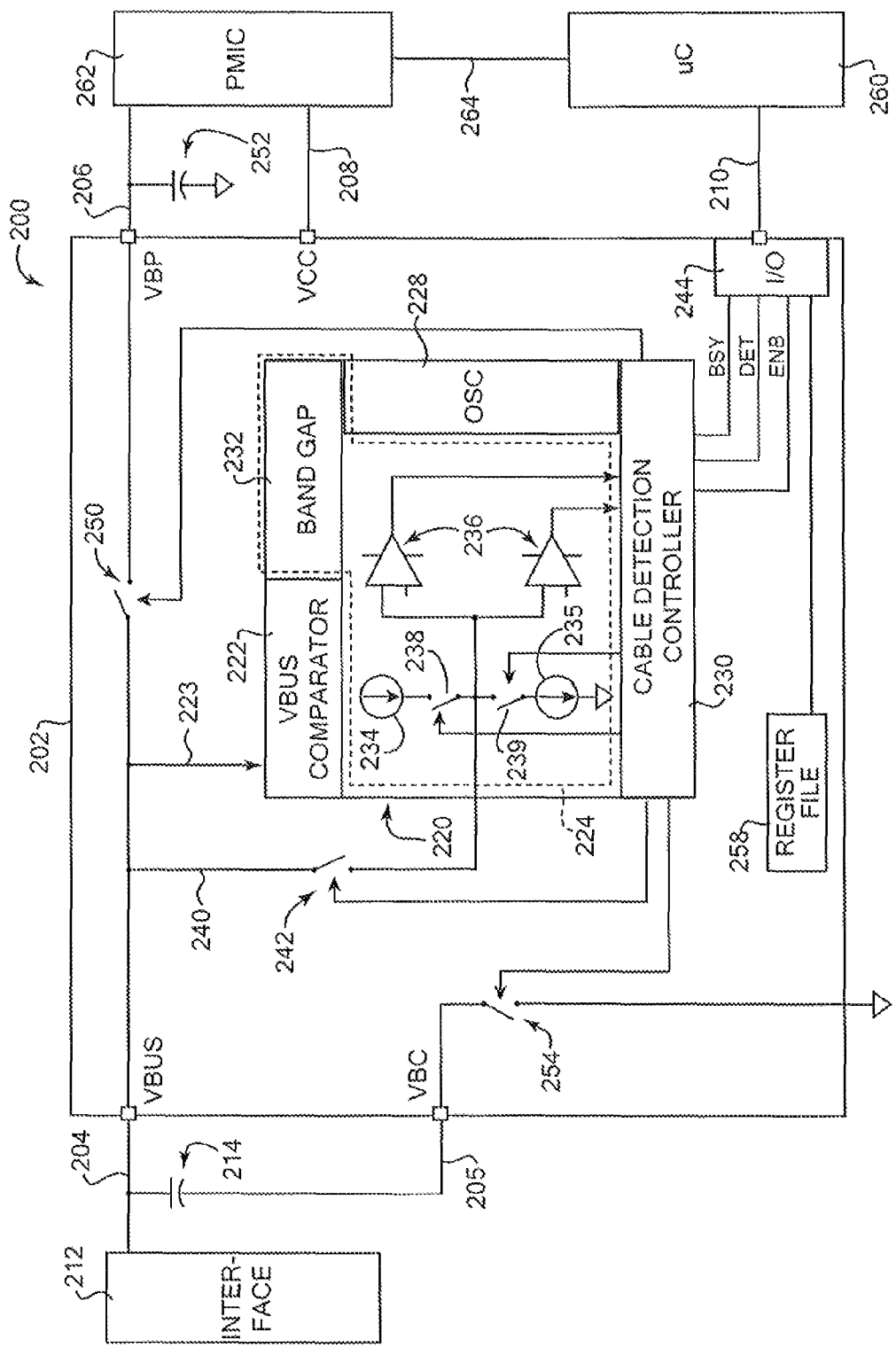
FIG. 3 is a schematic diagram illustrating one example implementation of the cable detection system of FIG. 2.

FIG. 3 is a schematic diagram of one example implementation 200 of the cable detection system of FIG. 2. Other implementations can be used in other embodiments. The cable detection system 200 can be provided on an integrated circuit 202, such as a integrated circuit package, in some embodiments. Other embodiments can provide one or more of the components as discrete components separate from a package. The integrated circuit 202 can include a number of inputs or pins for signals, including for a VBUS line 204 providing a voltage from the communication interface, a VBC line 205 coupled to an external capacitor, a VBP line 206 receiving power from the VBUS line for device components, a VCC line 208 providing an operating voltage from a battery or other source, and I/O lines 210 communicating with a microcontroller.

VBUS line 204 is provided from the interface connection 212, such as a USB interface in the examples given. An external capacitor 214 can be connected to the VBUS line 204 as per some communication interface specifications. In the example of a USB interface, the connection 212 can include other lines, such as D+ and D− signal lines and a ground line (not shown).

A control block 220 can be provided within the integrated circuit 202 to control cable detection test measurements. The block 220 can, for example, be implemented on a semiconductor chip or other substrate or integrated block. In the example shown, control block 220 can include a VBUS comparator 222, a waveform generator 224, an oscillator 228, and a cable detector controller 230. VBUS comparator 222 can be used as the VBUS comparator 126 described above, e.g., to determine whether there is any voltage on the VBUS line 204 as controlled by the cable detection controller 230 and to report the results of line voltage measurements. In some embodiments, comparator 222 can be coupled to the VBUS line 204 by a line 223.

Waveform generator 224 can be used as the waveform generator 128 of FIG. 2, and can include components such as a bandgap block 232, current sources 234, and operational amplifiers 236. In some embodiments, a line 240 can be coupled to the VBUS line 204 and a switch 242 is controlled by the cable detection controller 230 to allow the switch to be opened or closed. The switch is closed when the testing procedure is to begin and the waveform generator 224 is to provide currents to measure the capacitance on the VBUS line 204. When the testing procedure is not being performed, switch 242 is opened to isolate the constant current sources 234 from the VBUS line 204 during normal operation. In other embodiments, switch 242 is not needed and the constant current sources 234 can both be turned off for an equivalent function. The bandgap block 232 allows stable, temperature-constant currents for the current sources 234 and 235.

The line 240 is coupled to constant current sources 234 and 235 and is connected to inputs of the op amps 236. The cable detection controller 230 controls switches 238 and 239 to selectively connect only one of the current sources 234 and 235 to the line 240, thereby alternately injecting current into the VBUS line 204 and sinking current from the VBUS line. For example, switch 238 is closed and switch 239 opened to allow current source 234 to inject current into VBUS line 204, and switch 239 is closed and switch 238 opened to allow current source 235 to sink current from VBUS line 204. The constant current in VBUS line 204 causes a ramp voltage to be generated on the VBUS line 204 due to capacitance present on the line 204. The ramp voltage cycles from zero voltage to maximum ramp voltage and back to zero repeatedly based on the injecting and sinking of the constant currents as controlled by the controller 230. The op amps 236 are used as comparators to implement predetermined high and low voltage thresholds for the ramp voltage. When the high voltage threshold is reached by the ramp voltage, the controller 230 opens switch 238 to stop injecting the constant currents and closes switch 239 to start sinking the constant currents from line 204 to cause the voltage ramp to fall, and when the low voltage threshold is reached by the ramp voltage, the controller 230 opens switch 239 to stop sinking current and closes switch 238 to start sourcing current and cause the voltage ramp to rise. The op amps 236 output the comparison and threshold signals to the cable detector controller 230 to allow controller 230 to control the switches 238 and 239 appropriately.

The switches 238 and 239 also can function as the VBUS discharge block 124 of FIG. 2, to discharge any residual voltage on the VBUS line 204 before a cable detection measurement test is made using the waveform voltages described above. The cable detection controller 230 can close switch 242 (if implemented), open switch 238, and close switch 239 to connect the VBUS line 204 to ground through the constant current source 235, allowing voltage to discharge.

The oscillator 228 can be used for oscillator 130 of FIG. 2 as an accurate timing source to provide a predetermined timing period during which the waveform generator 224 generates ramp (or other) voltages and the cable detection controller 230 counts the ramps for determination of capacitance on the VBUS line 204, as described in greater detail below.

The cable detection controller 230 can include the controller logic 132 of FIG. 2 for controlling the various components of the circuit 202 for performing cable detection measurement tests. In some embodiments, the cable detection controller 230 can include a finite state machine (FSM). For example, the controller 230 controls the VBUS voltage discharge, isolation, and comparison described above, the probing waveform on the VBUS line, and a count of the number of cycles in the waveform to estimate capacitance on the VBUS line as described in greater detail below. One example process of performing the measurement test using controller 230 is described below with respect to FIGS. 4A and 4B. The cable detection controller 230 can also send and receive signals to an I/O block 244 provided on the circuit 202, such as signals BSY, DET, and ENB, which affect the cable detection measurement test as described below. I/O block 244 can be connected to a microcontroller 260 to provide status signals from the controller 230 to the microcontroller 260, and to receive commands and/or data from the microcontroller 260 and provide these to the controller 230.

A switch 250 can be provided on the VBUS line 204 within the circuit 202 to disconnect the VBUS line 204 from the VBP line 206. The switch 250 can be used as the VBUS isolate block 110 as described above for FIG. 2, to disconnect external capacitance and components at the VBP line 112 to prevent the capacitance and components from interfering with cable detection measurement tests. For example, the external capacitor 252 that is connected to the VBP line 206 can be disconnected from VBUS line 204. In this example, the cable detection controller 230 can outputs a control signal to control the switch 250 opening and closing.

A switch 254 can be included in circuit 202, connected to VBC line 205 and controlled by cable detection controller 230 to open or close based on a control signal provided to the switch 254. The switch 254 can be used for VBC disconnect block 120 of FIG. 2 to disconnect the external capacitor 214 from the VBUS line 204 and remove its capacitance from the line for cable detection measurement tests. Switch 254 disconnects ground from the VBC line 205, removing the capacitance of capacitor 214 from the VBUS line 204.

In some embodiments, a register file 258 can be included in the circuit 202 to store signal states, such as the DET signal. The register file can be updated when the signal states change. For example, a component such as the microcontroller 260 can read the register file 258 to determine the currently-determined status of cable connection or other device statuses and functions.

Microcontroller 260 is one example of a component included in the device 14 which can interface with the circuit 202 of the cable detection system 200. The microcontroller 260 can receive power from the power management integrated circuit (PMIC) 262 on line 264. One or more microcontrollers 260 can control and perform various operations of the device 14. For example, if the device 14 is a blood glucose meter, the microcontroller 260 can control the glucose sensor of the device, analyze the glucose measurements, control a display to output resulting information, and set parameters or functions of the device based on input from a user or other device. With respect to the circuit 202, the microcontroller 260 can receive signals from the cable detection controller 230, including (in the example of FIG. 3) a BSY signal indicating whether a cable detection test measurement is currently being performed, a DET signal indicating whether a cable is connected to the device, and an ENB signal indicating whether the cable detection mode is disabled. The microcontroller 260 can in some embodiments send one or more of the signals, e.g., send the ENB signal to the cable detection controller 230 to command that the detection mode be enabled or disabled, or reset a cable detection measurement test. Other signals can be used in other embodiments. A local memory can also be included for use with the microcontroller 260, e.g. included in the microcontroller 260 and/or one or more separate memories connected to the microcontroller 260 and other components.

Power management integrated circuit (PMIC) 262 can be used to manage and provide power from a power source internal to the device 14, such as a battery. The PMIC 262 can receive power from a power source and distribute the power to the circuit 202 in the VCC line 208, to the microcontroller 260 on line 264, and to any other component requiring power. In some embodiments, the PMIC 262 can also receive power on the VBP line 206 from the VBUS line 204 of the communication interface, and manage and distribute that received power to other components, such as to recharge a power source such as a battery or supply the power to a component.

Similarly as described above for FIG. 2, in alternate embodiments the VBC line 205 can be measured and provided with currents for the cable measurement test rather than VBUS line 204 to perform equivalent functions as described above, if the VBC line 205 is disconnected from ground using switch 254. For example, line 240 and line 223 can be connected to VBC line 205 instead of VBUS line 204.

Figure 4A:
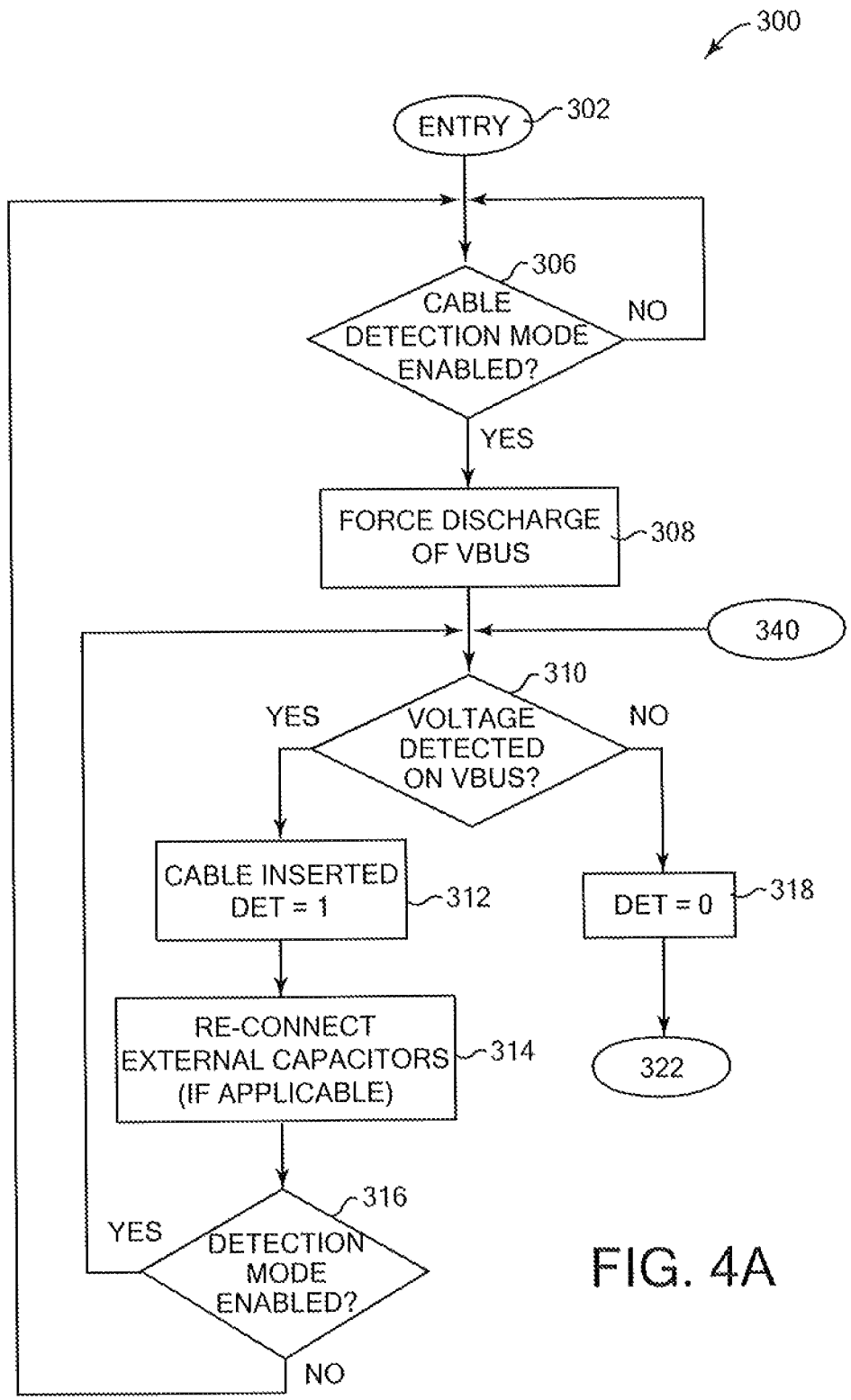
FIGS. 4A and 4B are flow diagrams illustrating one example of a method for detecting a cable connected to a device.

FIG. 4A is a flow diagram illustrating one example of a method 300 for performing a cable detection measurement test to detect whether a cable is connected via a communication interface. For example, method 300 can be implemented by the logic 132 or cable detection controller 230 of the cable detection system 100 or 200. Method 300 can be implemented using software, hardware, or a combination of software and hardware elements. A software embodiment can include but is not limited to firmware, resident software, microcode, etc. In some embodiments, the method 300 can be implemented using a finite state machine (FSM) or other logic or circuitry provided on the cable detection system or other component of the device 14. Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk.

The method has an entry point at 302. In step 306, the process checks whether the cable detection mode has been enabled. A cable detection mode can be disabled such that the cable detection described herein is not performed. In the example of FIG. 3, the cable detection mode can be enabled or disabled based on the received ENB signal, such as in some examples receiving an ENB signal as commanded by a device controller. In some embodiments, a disabling of the detection mode can occur when entering a low-power mode of the device 14. For example, the device 14 can be placed in a low-power mode when it is not performing normal functions for a user nor performing a cable detection test. Low-power mode consumes minimal power and, e.g., preserves battery life. The low-power mode can, in some embodiments, automatically be entered by the device 14 if no other activity is detected or required to be performed. In other embodiments, no low-power disabled mode is used on the device 14. In some embodiments, cable detection mode is enabled during a normal operating mode of the device 14, in which the device is consuming power for normal functionality and can perform its standard functions. For example, the device 14 can periodically enter cable detection mode to perform cable detection measurement tests for a predetermined amount of time or a predetermined number of tests.

In one example, the device 14 is a blood glucose meter, and in normal operating mode the user can cause the device to perform measurement of glucose, as well as display information measured during a test, stored in memory of device 14, or received from another device such as host 12. In some embodiments, the normal operating mode is entered from a low-power mode based on one or more commands or other control signals from a controller, such as microcontroller 260 or other controlling component. In some embodiments, the ENB signal (or other signal) can be received from the microcontroller 260 by the detection system 200 to cause normal operating mode to be initiated. In some embodiments, the microcontroller 260 can determine to enter normal operating mode in response to predetermined conditions occurring, such as detected activity of the device 14 initiated by the user, host 12 providing input to the device 14, etc.

In some embodiments, during a normal operating mode of device 14, the cable detection mode is also implemented on the device 14, in which cable detection measurement tests are performed by the detection system 200. For example, in some embodiments, the cable detection mode can be entered immediately upon entering the normal operating mode from an power-off state or from the low-power mode; after the measurement test(s) are complete, then the cable detection mode can be disabled. In some embodiments, the cable detection mode can then be entered periodically, e.g., after a predetermined time period of the normal operating mode. In other embodiments, the cable detection mode can be continually operating during normal operation mode. In the cable detection mode, the cable detection system 200 reads the VBUS voltage and performs test measurements of the device connection to the communication interface to determine whether a cable is currently connected to the device 14, as described below.

If cable detection mode is not currently enabled as checked in step 306, then the process returns to entry point 302 to continue to monitor the cable detection mode on device 14 at step 306. If cable detection mode is enabled, such as in some embodiments using the ENB signal (e.g., set low in examples below), then the cable detection measurement testing is initiated.

In step 308 a discharge is performed of the input line of the communication interface that is to be measured, which is a power line such as the VBUS line in examples described herein. For example, this forced discharge can be controlled by the control logic 132 (e.g., controller 230) controlling the VBUS discharge block 124 (e.g. switches 238 and 239 in FIG. 3) to remove any residual voltage on the VBUS line which would interfere with capacitance measurements for cable detection, by connecting the VBUS line to ground.

In step 310, the VBUS line is checked for voltage. This check can be performed, for example, using the VBUS comparators 126. If voltage is detected on the VBUS line, then this indicates that a connected device (such as host 12) is driving the line and that therefore a cable is currently connected to the device 14. In this case, step 312 is performed, in which the DET signal is set to indicate that a cable has been detected and is connected to the device 14. In these examples, DET is set high (and/or is written in memory) to indicate cable connection, but other states, signals or values can be used in other embodiments. Other embodiments can also indicate whether or not a host or other device is connected at the other end of a connected cable. In step 314, the external capacitors are reconnected, such as external capacitors 104 and 114. This is only applicable if these capacitors have been disconnected due to having run a measurement test as described below, e.g. in step 324 below.

In step 316, cable detection mode is again checked whether it is still enabled, e.g., the ENB signal is checked. If still enabled, then the voltage on VBUS is again checked at step 310 to determine whether the cable is still connected, so that the voltage of VBUS can be continually monitored during the cable detection mode. If the cable detection mode is not still enabled in step 316, then the process returns to entry point 302 and checks the detection mode in step 306. Cable detection mode may have been disabled if the ENB signal has been changed (e.g., asserted), indicating that the device is entering the low-power disabled mode, which can occur after any of a number of conditions, such as a predetermined period of time of cable detection has been completed, a predetermined time with no user input provided to the device 14, and/or if a command from a host 12 or microcontroller 206 commands that the cable detection mode be disabled and/or a low power mode be entered.

If voltage is not detected on the VBUS line at step 310, then a cable may or may not be connected to the device 14, and cable detection measurement tests are to be performed to determine whether a cable is connected. In step 318, the DET signal is set low (and, or is written in memory), or some other state, signal or value is set, to indicate that a cable is not connected to the device 14, which is a default state for this step since the actual cable connection status still needs to be tested. The process then continues to step 322 of FIG. 4B to perform measurement tests for detecting a cable.

Figure 4B:
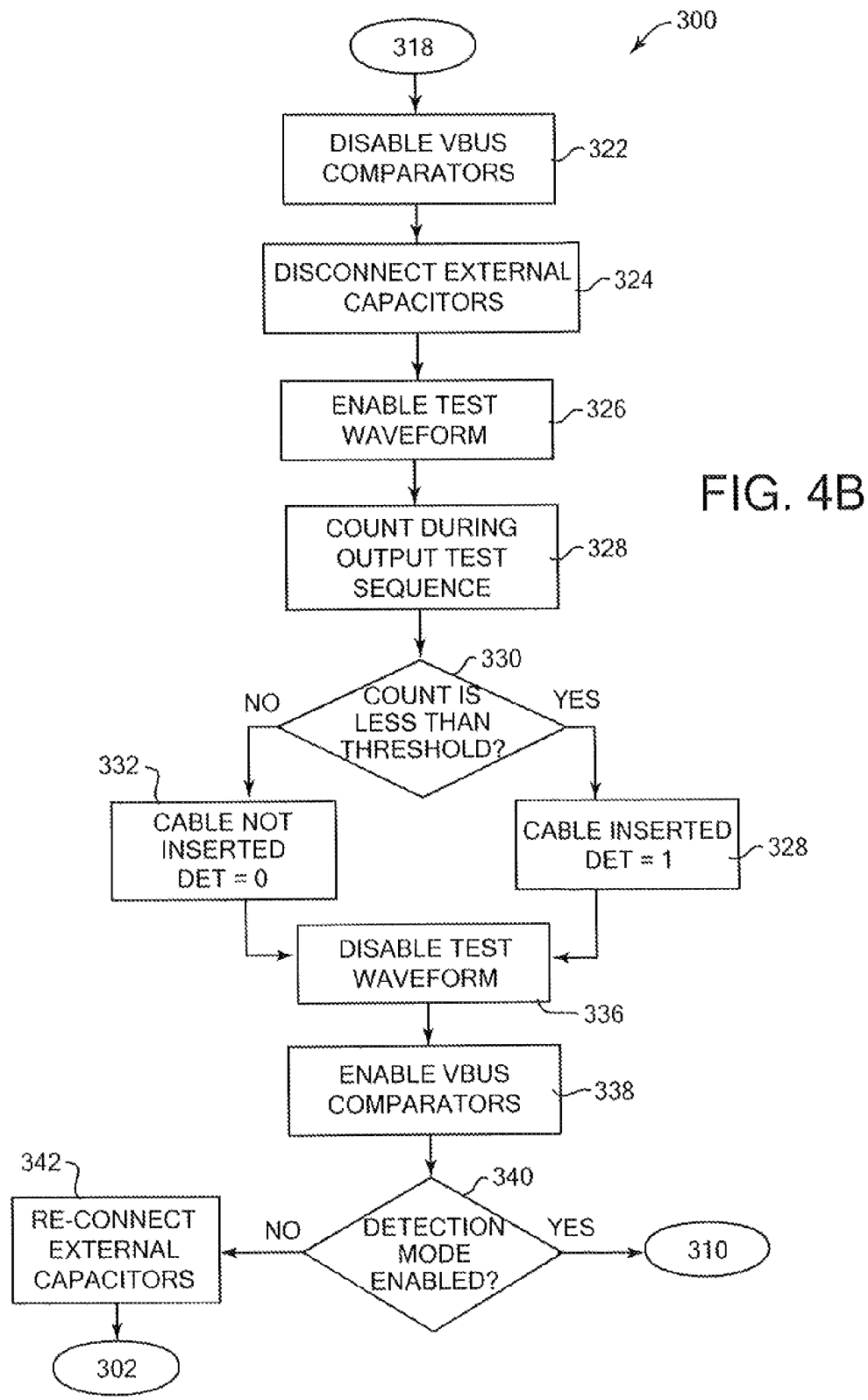

FIG. 4B is a flow diagram illustrating a continuation of the example method 300 of FIG. 4A for performing a cable detection measurement test to detect whether a cable is connected via a communication interface. Step 322 continues from step 318. In step 322, VBUS comparators 126 can be disabled since these comparators may affect the capacitance measurements of the detection test. In step 324, the external capacitance connected to the detection system 100 or 200 is disconnected. In the examples described above, this includes disconnecting the external capacitor 104 connected to the VBUS line, and the external capacitance and components connected to the VBP line. For example, in the example of FIG. 3, the switch 254 connected to the VBC input 205 can be opened, and the switch 250 connected to the VBP line 296 can be opened, to disconnect this capacitance. This prevents known external capacitance and components from affecting the test measurements of cable capacitance on the VBUS line.

In step 326, a test waveform is enabled and output from the waveform generator 128, the waveform being affected by the capacitance of the VBUS line. In one example, the test waveform is created from constant currents injected and sinked by the waveform generator 128 on the VBUS line, and can be a ramp waveform that increases and decreases its voltage linearly as controlled by sourcing and sinking current sources as described for FIG. 3.

In step 328, a count is made of the number of waveform cycles, such as the number of ramps, occurring during the test sequence that outputs the waveform. This count can be made by the logic 132, for example, for a predetermined period of time as measured by the oscillator 130. In one example, the predetermined period of time is 100 us, but can be other time periods in other embodiments. In step 330, after the predetermined period of time has elapsed, the resulting count of waveform cycles is compared to a threshold count value. This threshold count is a predetermined count that has been determined to reliably indicate the presence of a connected cable. In one example, the threshold count value is 128, but can be any suitable count value.

In step 330, the measured count is compared to the predetermined threshold. If the count is greater than the threshold count value, then a low capacitance is indicated since a greater number of waveform cycles were output in the time period. This low capacitance indicates that a cable is not currently connected to the device 14 on the VBUS line. Thus, in step 332, the DET signal or value is set low, to 0 (or other appropriate value or signal is provided) to indicate that no cable is connected, and the process continues to step 336, described below. If the count is less than the threshold count value, then a higher capacitance is indicated on the VBUS line since a lower number of cycles were output in the time period. This higher capacitance indicates the presence of a cable connected to the VBUS line. Thus, in step 334, the DET signal or value is set high, to 1 (or other appropriate value or signal is provided) to indicate that a cable is connected, and the process continues to step 336.

The above-described measurement of capacitance measures any capacitance that the detection circuit 202 input sees as external capacitance, such as cable capacitance (including any connectors), board capacitance, etc. This measurement is highly accurate, and able to detect small amounts of capacitance such as in the picofarad range.

In step 336, the test waveform output is disabled from the waveform generator 128, by the logic 132. In step 338, the VBUS comparators 126 are enabled by the logic 132. In step 340, the process checks whether detection mode is still enabled, e.g., indicated by the ENB signal. If so, the process returns to step 310 of FIG. 4A, in which the voltage on the VBUS line is checked once again. Since a cable may have been plugged in during the test procedure, this allows the cable to be immediately detected, any further test procedures can be omitted, and external capacitance re-connected while that voltage is detected.

If detection mode has been disabled as checked in step 340, then in step 342 the external capacitors are re-connected, such as reconnecting the VBC line 121 to ground by VBC disconnect block 120 to reconnect external capacitor 104, and reconnecting the VPB line 112 to the VBUS line 102 to reconnect external capacitor 114. This allows device operations to resume to normal before exiting the cable detection mode. The process then returns to entry point 302 of FIG. 4A.

In some embodiments, a BSY signal as shown in FIGS. 2 and 3 can be asserted (e.g., by the controller logic 132) during the cable detection test process described above. The signal can be asserted when the detection process begins and de-asserted when the cable detection process is over. For example, the BSY signal can be asserted in response to step 322 that disables the VBUS comparators, and can be de-asserted in response to enabling the VBUS comparators in step 340. In some examples, the DET signal or value can be updated to the current status of the cable at a transition edge (such as a rising edge) of the BSY signal. For example, a DET value in a memory such as register file 258 can be updated by the controller 132 or 230. The microcontroller 260 or other component can check the DET value in memory at any time to determine the current status of cable connection for the device.

A cable may be inserted or removed from the interface port of the device 14 during a cable detection measurement test. Since the VBUS comparators are repeatedly enabled and used to measure the VBUS voltage, a cable insertion can readily be detected and a cable removal will cause a cable detection measurement test. In some embodiments, a cable insertion may generate a number of glitches on the VBUS comparator output. Some embodiments can embed a de-bouncer such that upon discovering a new VBUS voltage, the de-bouncer qualifies the DET signal to indicate cable detection after a predetermined time or until a steady VBUS is measured.

FIGS. 5A-5H are timing diagrams showing examples of states of several signals used in the examples described above for several different operating states of the device 14 during the cable detection measurement test. These diagrams are meant to be illustrative of one example only. Different signals, signal levels, and timing relationships can be used in other embodiments.

Figure 5A:
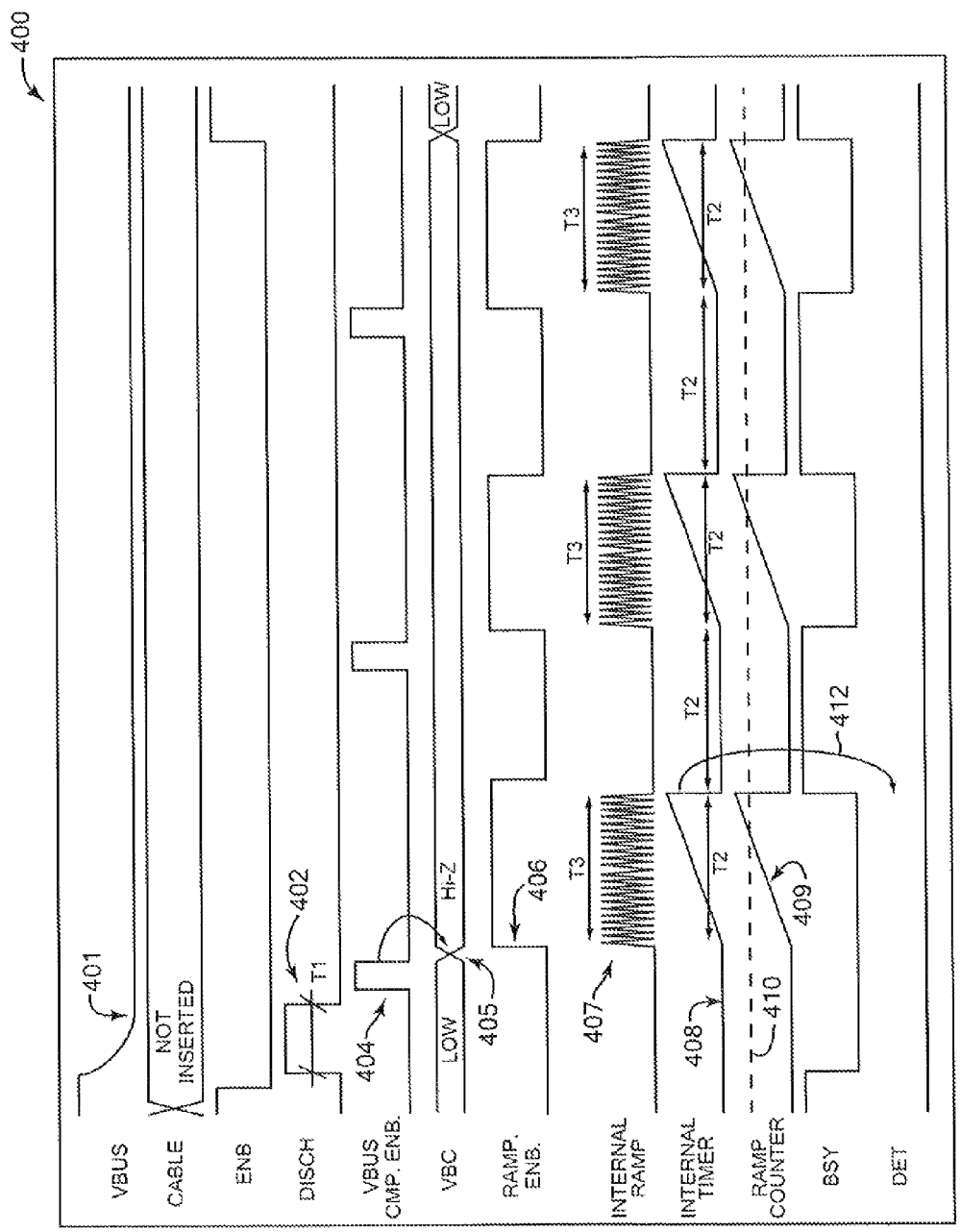
FIGS. 5A-5H are timing diagrams for different cable connection conditions and exemplary signals that can be used in the system of FIGS. 2 and 3.

In FIG. 5A, timing diagram 400 shows the states of several signals when the cable is disconnected, e.g., not inserted into the interface port connector of device 14. In this example, a residual VBUS voltage is initially present and then quickly drops to zero at 401 after a discharge of the voltage by the VBUS discharge block 120 as in step 308 of FIGS. 4A-4B. In this example, the discharge of the VBUS voltage occurs over a time period T1 at the initial stage of the measurement test procedure as shown by discharge control signal 402. In one example, T1 can be about 25 ms, or other times in other embodiments. The ENB signal is low indicating normal operation and cable detection mode, the VBUS comparator enable signal 404 is, before each cable detection waveform measurement, set high briefly to enable the comparators to check the VBUS voltage as in step 310 and then set low to disable the comparators as in step 322 for the waveform test. After the comparator enable signal 404 is lowered, the external capacitance is disconnected, which is shown at the VBC line 405 as going from low impedance to high impedance.

The ramp waveform enable signal 406 is set high, as in step 324, during the time periods in which the test waveform is output. The internal timer signal 408 ramps up during a predetermined test period T2, which in this example is 100 us and can be other periods in other embodiments, and then is reset back to zero at the end of the predetermined time period. The test waveform is shown as the internal ramp signal 407 providing a number of voltage oscillations within a predetermined test period T3. In some embodiments, T3 can be the same as T2, while in other embodiments T3 can be different than T2. The internal ramp waveform is output for the test period, after which the ramp enable signal 406 goes low and disables the internal ramp waveform. When the internal ramp output is low, the process returns to step 310 where the VBUS comparator is activated by signal 404 and measures the voltage on the VBUS, after which the ramp enable signal 406 is again set high and waveform output for another measurement test. The ramp counter 409 increases in value as it counts more waveform signal cycles, until the waveform is disabled by signal 406 and the counter is set back to zero or other starting value. The threshold counter value used to determine a cable connection is indicated by dashed line 410. In this example, the ramp counter goes above the threshold value, which indicates that less capacitance is present and therefore no cable is connected to the interface of the device 14. The BSY signal is asserted high when the test period is complete and the waveform is disabled, and is set low when the waveform is again output. The DET signal is set after the test period and the BSY signal goes high, as indicated by arrow 412. In this example, the DET value is low to indicate no cable is connected, and remains at the same level (low) since no cable is detected after any of the waveform tests. When the ENB signal is asserted high at the end of the time period, the cable detection mode is disabled, causing the external capacitance to be reconnected to the VBUS line.

Figure 5B:
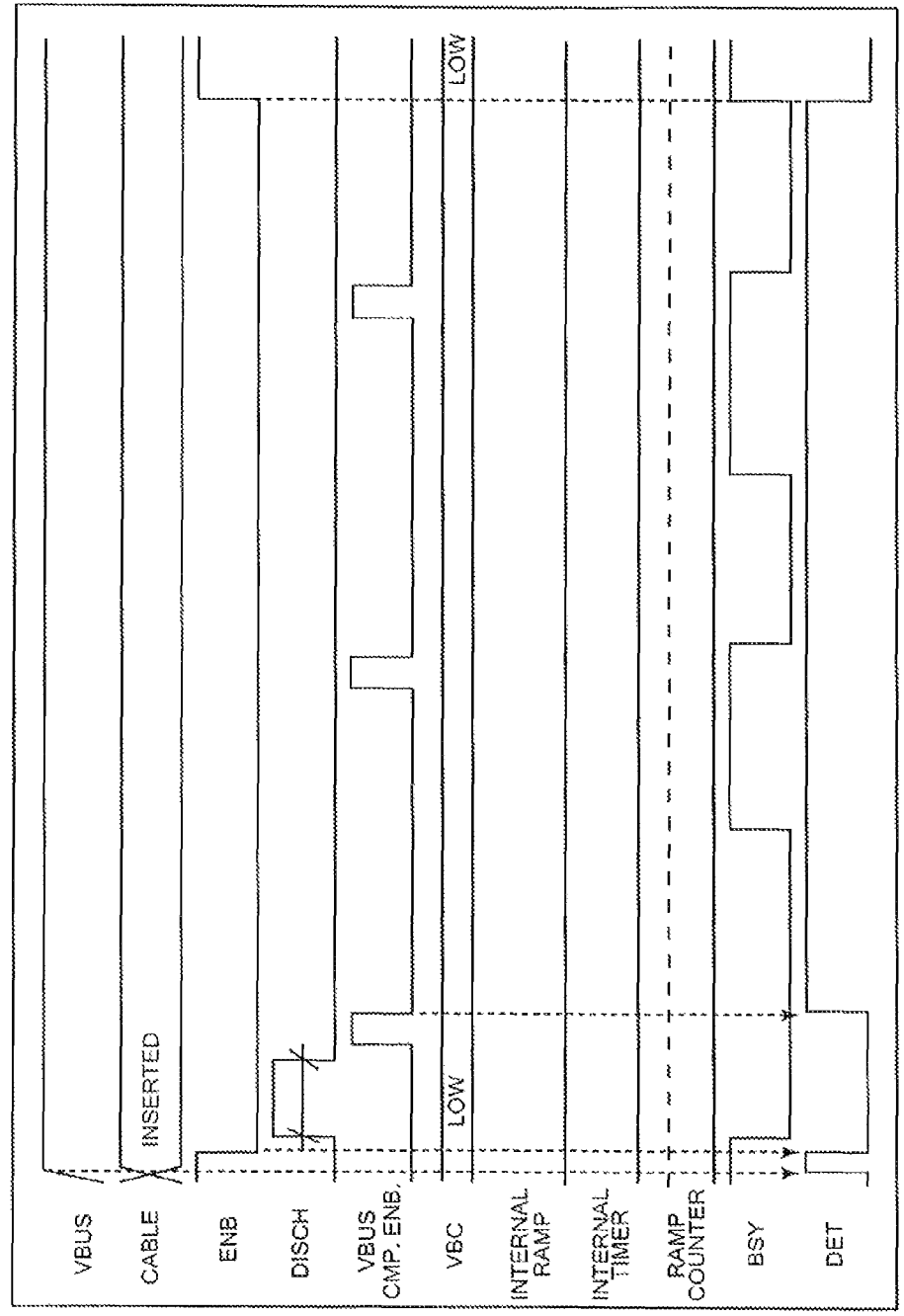

FIG. 5B is a timing diagram 420 showing the states of the signals of one example of the cable detection system 200 when the cable is connected to the device 14 and the other end of the cable is connected to host such that a VBUS voltage is present. In this example, the VBUS voltage is high, and so the VBUS comparators 126 detect that a cable is connected. The process never gets to the waveform test since the VBUS voltage is detected and a cable is assumed to be connected. The DET signal varies based on the VBUS going high (first DET transition, to high), the ENB signal going low (second DET transition, to low), and then the VBUS comparator enable signal going low (third DET transition, to high). The DET signal then remains high, indicating that the comparator found the VBUS voltage and that a cable is connected to the device 14. The VBUS comparator is enabled periodically and continues to measure the VBUS voltage and omit the measurement test. At the end of the shown time, the DET signal goes low based on the ENB signal going high.

Figure 5C:
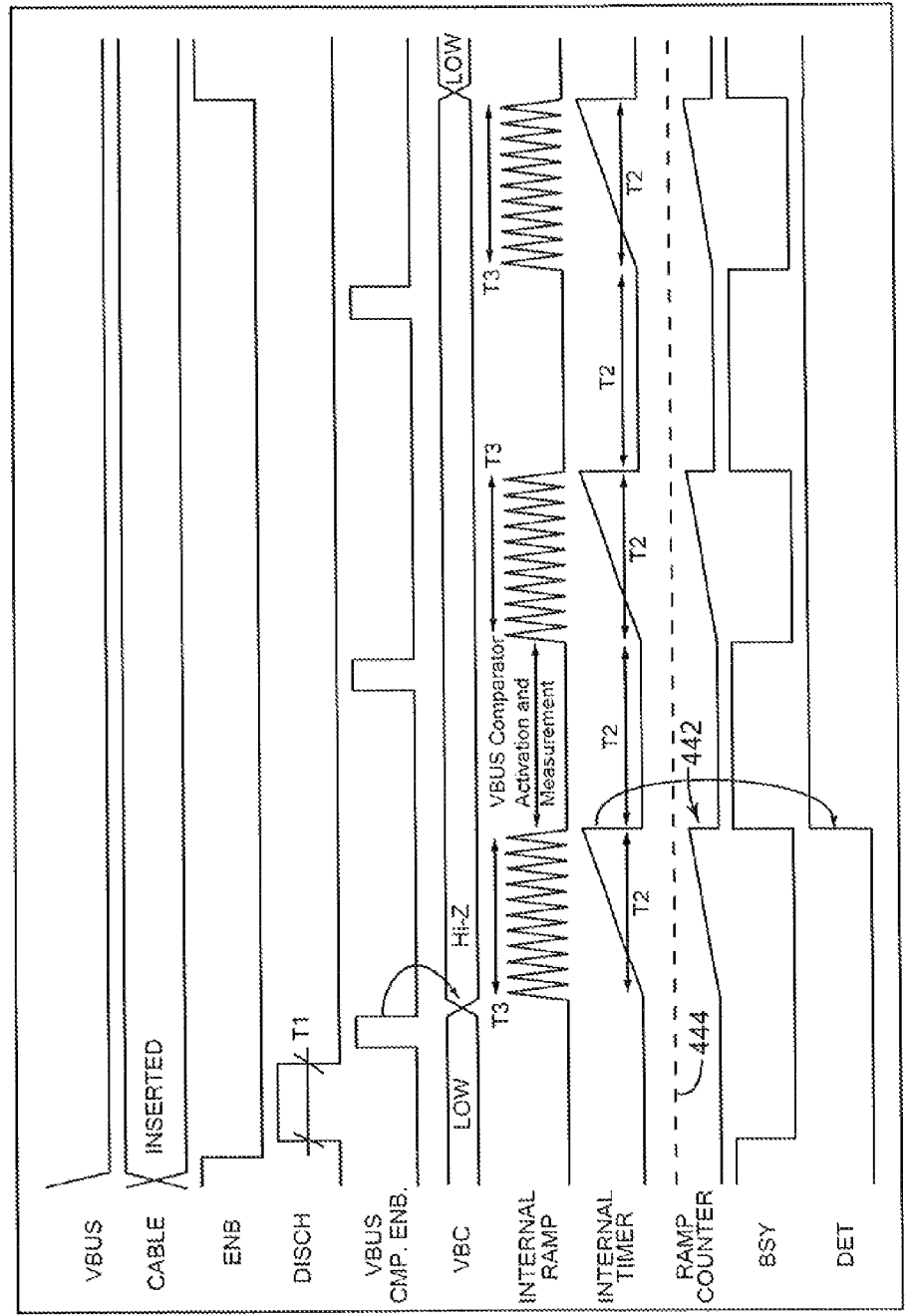

FIG. 5C is a timing diagram 440 showing the states of the signals of one example of the cable detection system 200 when the cable is connected to the interface port of the device 14, and the other end of the cable is not connected to the host 12 or other device, and where a voltage is not present on the VBUS line. Since there is no VBUS voltage, any residual voltage is discharged on the VBUS line and the test waveform is output, similarly as in FIG. 5A. In this case, due to the greater capacitance from the cable, the waveform has less cycles within the enabled time period, and thus the ramp counter signal 442 provides a maximum counter value that is below the threshold counter value 444. This indicates that a cable is connected to the device 14. Thus, the DEL signal is set high, indicating that a cable is connected, after the BSY signal rises and the first test cycle is complete.

Figure 5D:
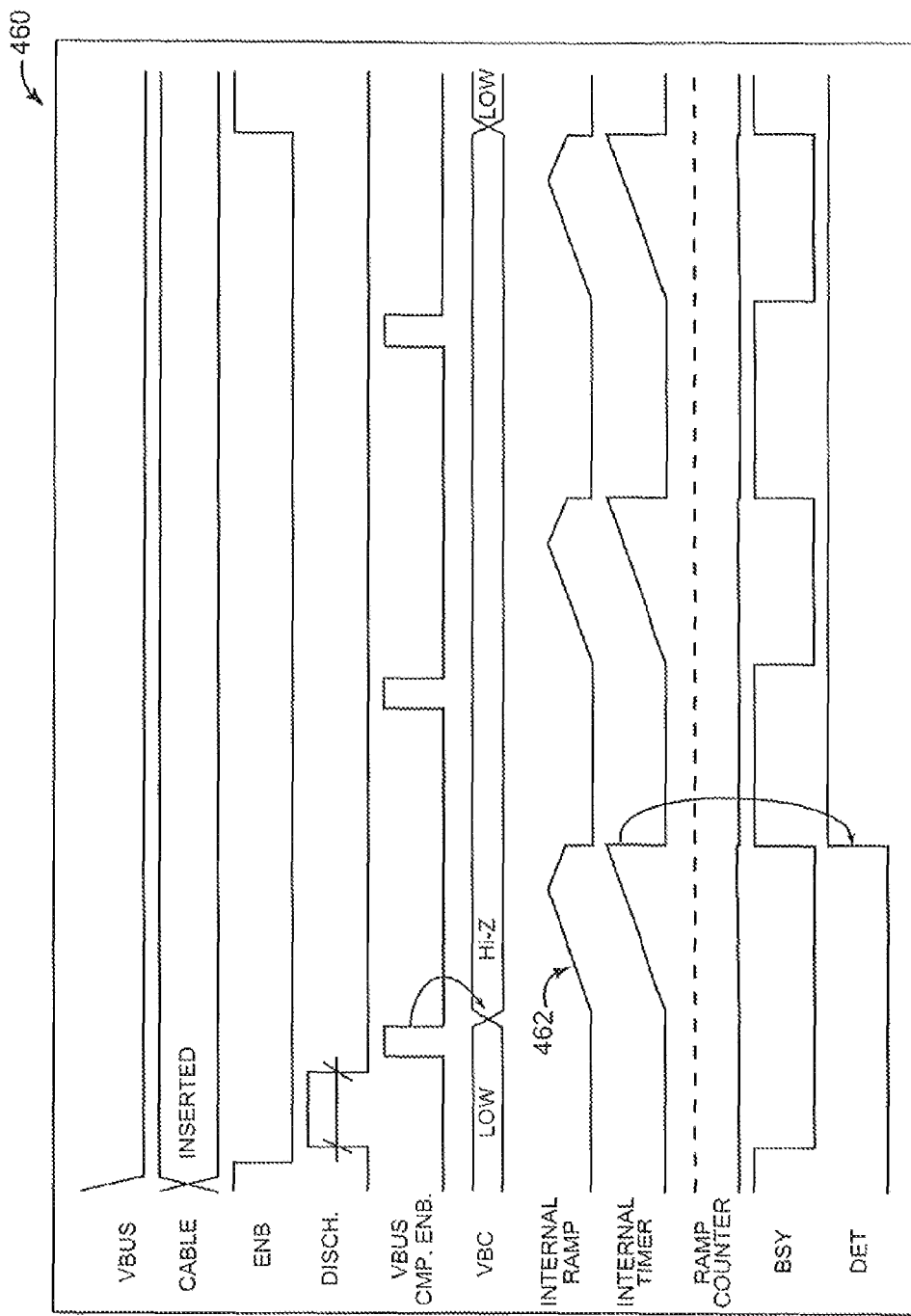

FIG. 5D is a timing diagram 460 showing the states of the signals of one example of the cable detection system 200 when the cable is connected to the interface port of the device 14, the cable is connected to a host 12 at its other end, and the VBUS voltage is not present on the VBUS line (e.g., because the host 12 is not providing a voltage, or other condition). Since there is no VBUS voltage, any residual voltage is discharged on the VBUS line and the test waveform is output as internal ramp signal 462, similarly as in FIG. 5A. In this case, the internal ramp signal ramps up much more slowly than in FIG. 5A or 5C due to the larger capacitance provided from the inserted cable and the connected host. Thus, only one cycle (or portion of one cycle) is completed by the test waveform within the predetermined time period, and the ramp counter signal is incremented to a counter value barely above zero during the test period. This is far below the threshold counter value, and therefore the DET signal is set high, indicating that a cable is connected, after the BSY signal rises and the first test cycle is complete.

Figure 5E:
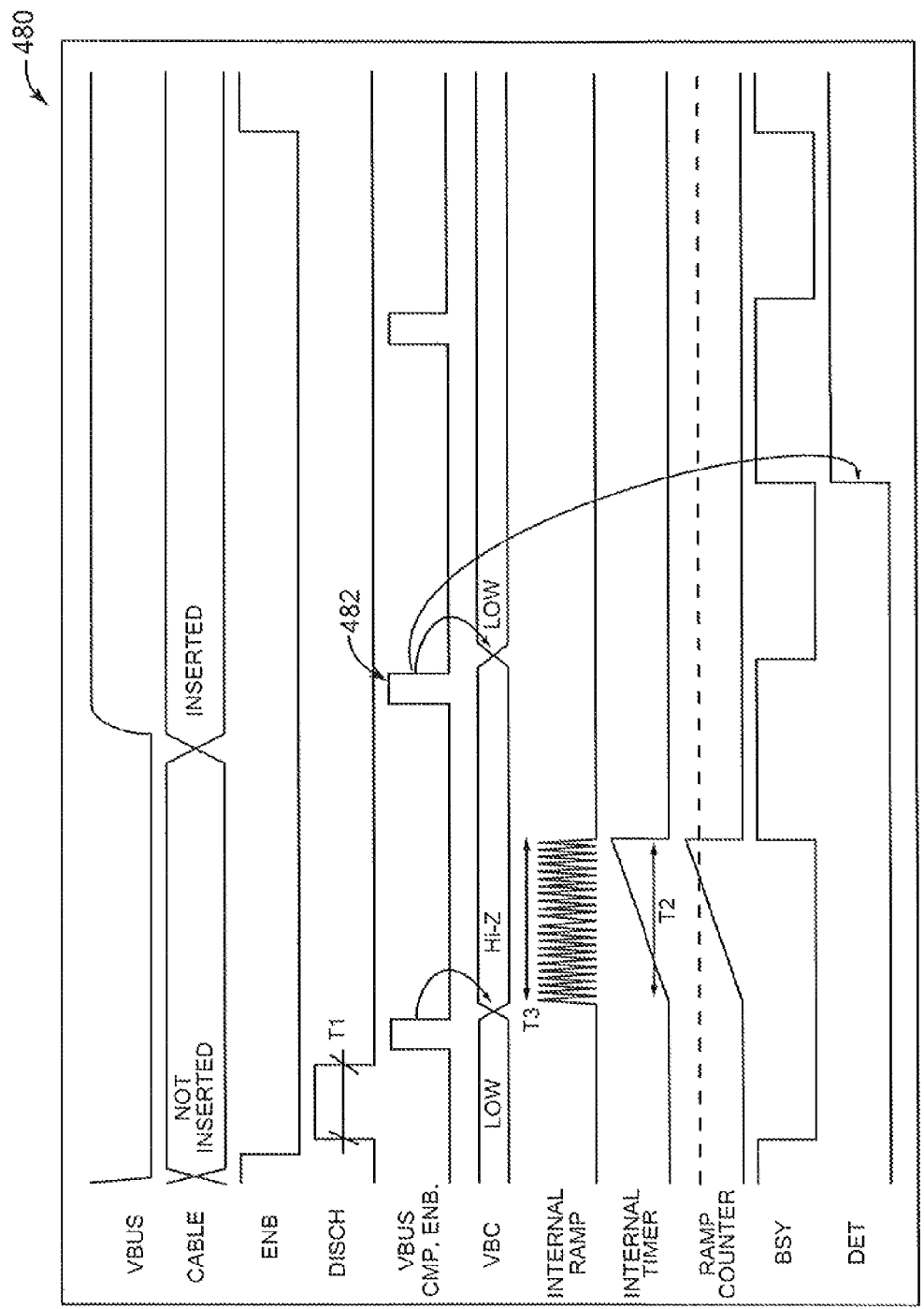

FIG. 5E is a timing diagram 480 showing the states of the signals of one example of the cable detection system 200 when the cable is initially not connected to the device 14, and then the cable is connected to the device 14 during the measurement tests, i.e. the measurement is interrupted by the appearance of a VBUS voltage that can be, for example, provided by a host 12 connected at the other end of the cable. The VBUS voltage is initially shown to be zero, at which time the cable is not connected. During this stage, the internal ramp signal indicates an output waveform similar to the example of FIG. 5A, and the ramp counter reaches a value above the threshold indicating no cable connection. This causes the DET signal to stay low.

About halfway through the length of time shown in FIG. 5E, a cable is inserted in the connector of the device 14. This occurs after the first output waveform test and before the next waveform test. At the next VBUS comparator enable signal 482, the comparators detect the new VBUS voltage on the VBUS line. This causes the external capacitors, such as external capacitor 104 or 214, to be re-connected to the VBUS line, as indicated by the VBC signal. With a VBUS voltage being detected, the process knows that a cable is now connected and can omit further measurement tests. At the next rising edge of the BSY signal, the DET signal is set high, indicating that a cable is currently connected.

Figure 5F:
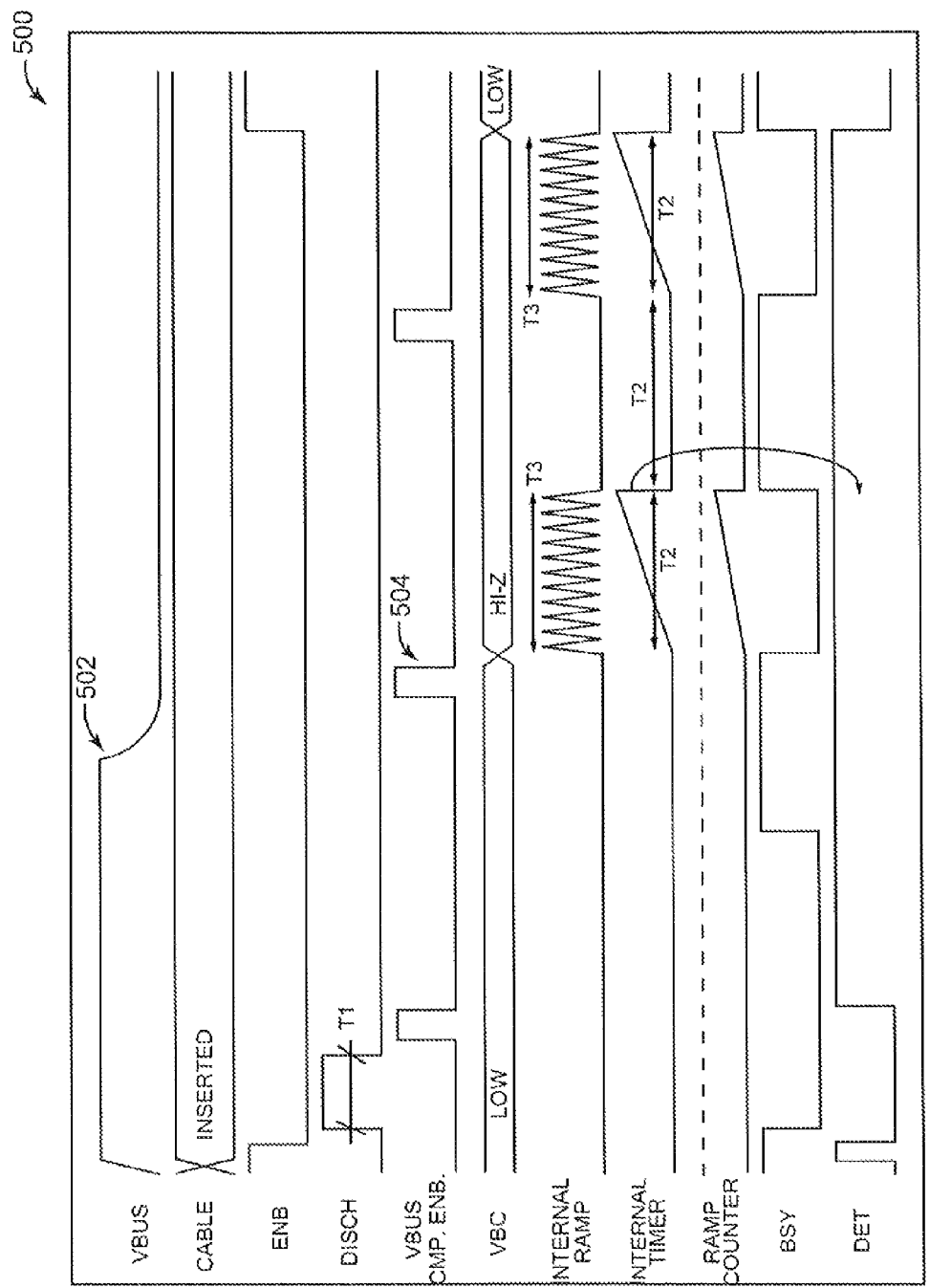

FIG. 5F is a timing diagram 500 showing the states of the signals of one example of the cable detection system 200 when a cable is initially connected to the interface port of device 14 and to a host such that a VBUS voltage is present, and then the cable is disconnected from the host during the measurement tests. In this example, the VBUS voltage is initially high, and the VBUS comparators 126 detect this voltage. The process assumes that a cable and host are connected and thus does not initiate the waveform test.

After the initial period, the cable is then disconnected from the host, causing the VBUS voltage to drop at 502. When this zero VBUS voltage is detected by the VBUS comparators during the enabling pulse 504, the external capacitors are disconnected and the detection measurement test is begun, including outputting the test waveform on the internal ramp signal. The measurement test provides a ramp counter that is under the threshold counter value, and so the test determines that a cable is connected. Consequently, the DET signal remains high, indicating that a cable is connected to the device 14. Thus, the method described herein is capable of detecting the presence of a connected cable even after a host is disconnected from the other end of the cable and the VBUS voltage is removed.

Figure 5G:
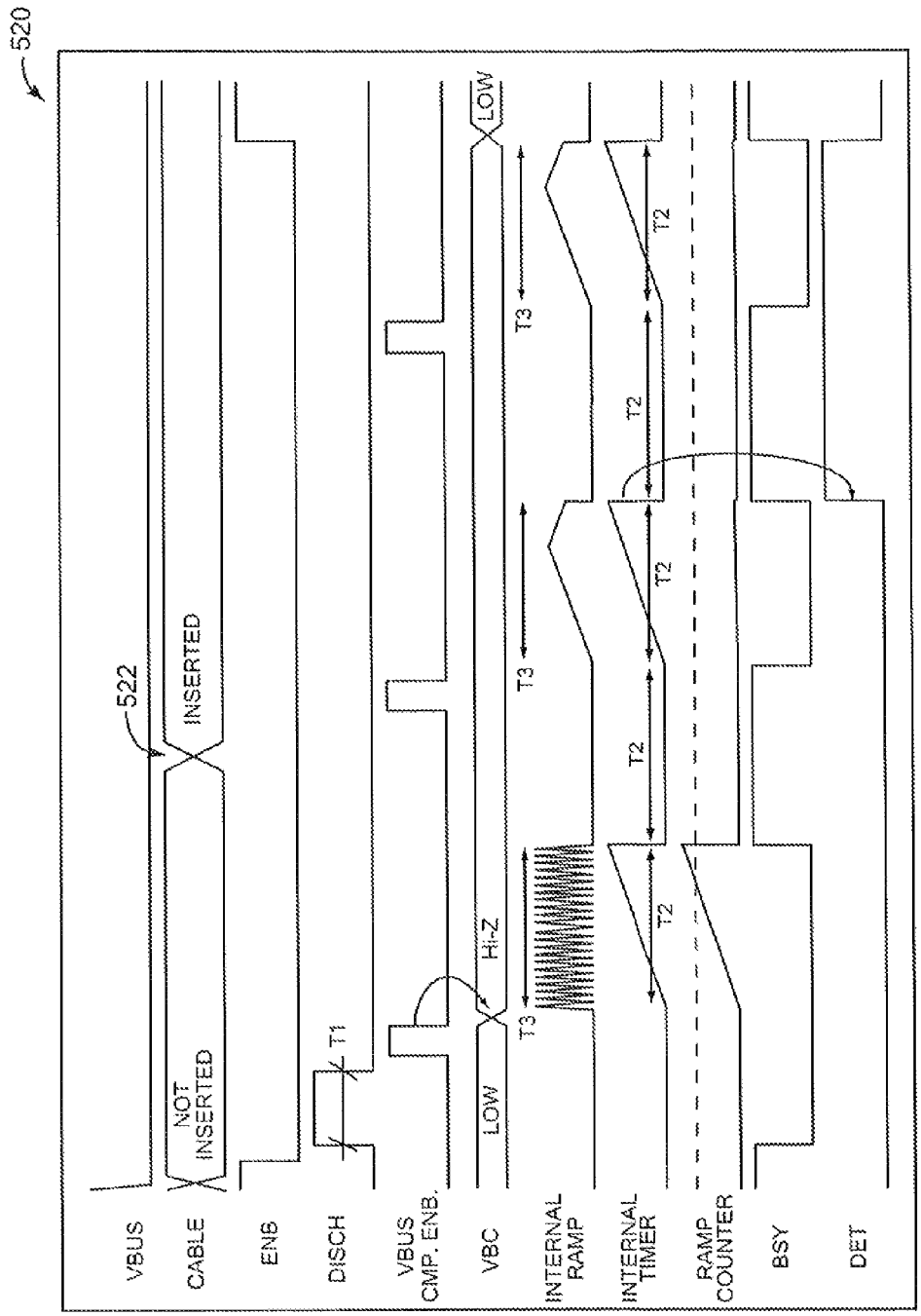

FIG. 5G is a timing diagram 520 showing the states of the signals of one example of the cable detection system 200 when the cable is not initially connected to the device 14, and the cable is then connected to the device 14 during the measurement tests. In this example, the cable is plugged into the host 12 at its other end, yet the VBUS voltage is zero; e.g., the host is not providing a VBUS voltage, or other condition has occurred. The VBUS voltage stays low, causing the cable detection process to repeatedly perform the waveform measurement test. In the initial stage when the cable is not connected, the internal ramp signal provides a waveform that has a high frequency and many cycles, so that the ramp counter increases to a point above the threshold counter value. This causes the DET signal to remain low, indicating that no cable is connected.

At a time 522, a cable is inserted into the device connector. The VBUS does not rise. In the next test cycle, since no VBUS voltage is detected by the comparators, the test waveform is output. However, as indicated by the internal ramp signal, the increased, large capacitance caused by the connected cable and host 12 causes the ramp to rise very slowly and the frequency of waveform cycles to be very low, similarly to the signals shown in FIG. 5D. Since the ramp counter is far below the threshold counter value, the DET signal goes high to indicate that a cable has been inserted.

Figure 5H:
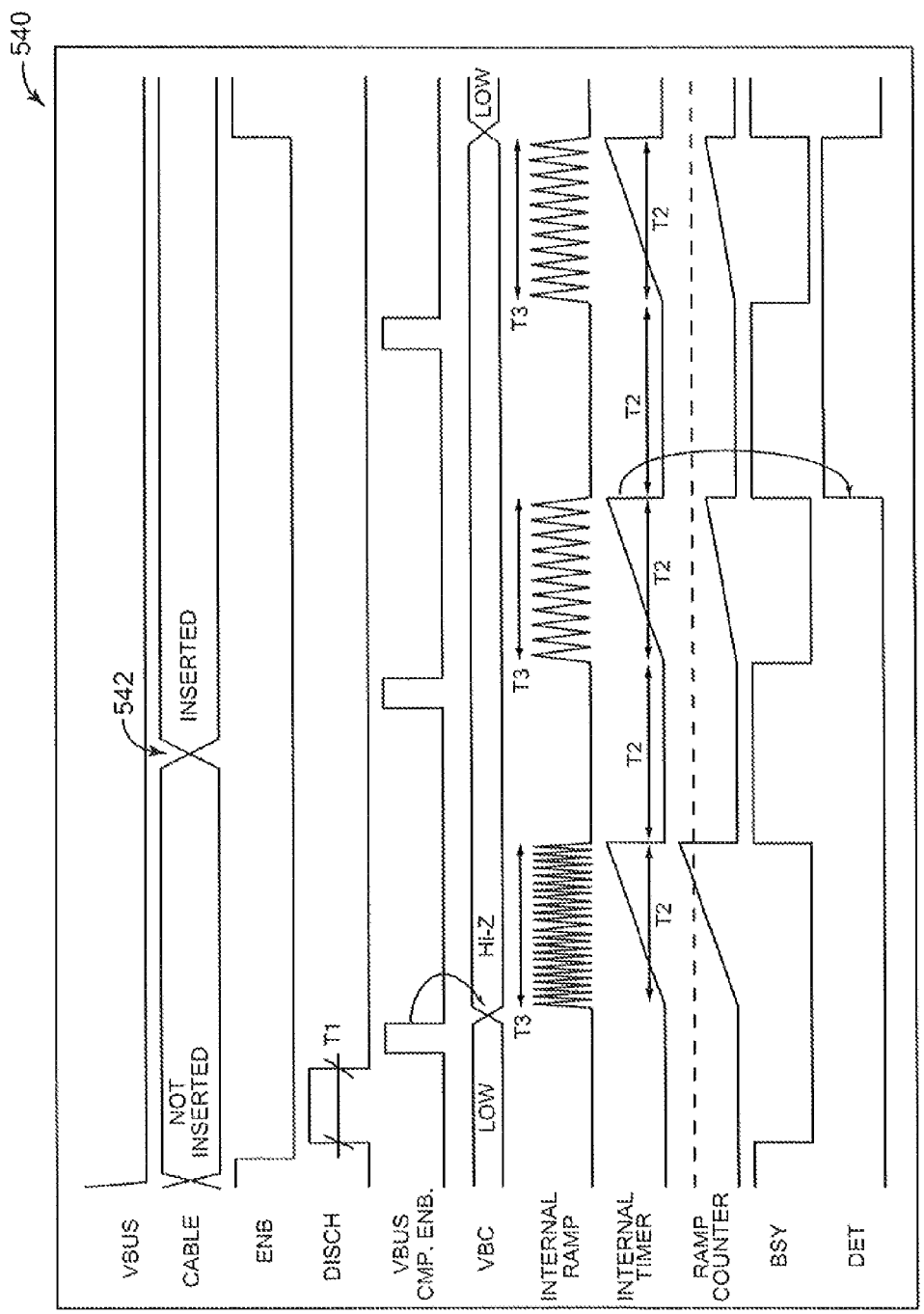

FIG. 5H is a timing diagram 540 showing the states of the signals of one example when the cable is initially not connected to the device 14, and then the cable is connected to the device 14 during the measurement test. In this example, the cable is not plugged into the host 12 at its other end, providing less capacitance than if the host were connected as in FIG. 5F. The VBUS voltage stays low, causing the cable detection process to repeatedly perform the waveform measurement test. In the initial stage when the cable is not connected, the internal ramp signal provides a waveform that has a high frequency and many cycles, so that the ramp counter increases to a point above the threshold counter value. This causes the DET signal to remain low, indicating that no cable is connected.

At a time 542, a cable is inserted into the device connector. The VBUS does not rise since the other end of the cable is not connected to the host 12. In the next test cycle, since no VBUS voltage is detected by the comparators, the test waveform is output. As indicated by the internal ramp signal, the increased capacitance from the cable causes the frequency of waveform cycles to be reduced. The ramp counter rises to just below the threshold counter value, so the DET signal goes high to indicate that a cable has been inserted.

One or more embodiments of the device described herein detect a connected cable by measuring the capacitance on an interface communication line through the probing of currents into that line. In other embodiments, other techniques can be used to measure capacitance in accordance with other features described herein.

The embodiments described herein allow the use of a common interface standard, such as USB, with cable detection features. Although the embodiments described herein are with reference to the USB interface, other interface standards can be used in other embodiments in accordance with features described herein. The cable detection system described above can measure very small capacitances, such as in the picofarad range. This allows the system to detect connections of items having very low capacitances, such as cables that have a floating end, and allow a device to determine whether a cable is currently connected to its port and whether to take appropriate measures.

Although various examples have been described using specific terms and devices, such description is for illustrative purposes only. The words used are words of description rather than of limitation. In addition, it should be understood that aspects of various other examples may be interchanged either in whole or in part. It is therefore intended that the claims be interpreted in accordance with their true spirit and scope and without limitation or estoppel.

What is claimed is:

1. A cable detection circuit for a device coupled to a communication interface, the cable detection circuit comprising:
a generator circuit comprising a first current source to inject current into a line of the communication interface through a first switch and a second current source to sink current from the line of the communication interface through a second switch, wherein the generator circuit is operative to provide currents on the line of the communication interface after removing residual voltage present on the line;
a voltage discharger coupled by an external switch to the line of the communication interface, wherein the voltage discharger is coupled through the second switch to the second current source to remove all residual voltage present on the line before the generator circuit provides currents on the line; and
a controller coupled to the generator circuit and operative to detect an amount of capacitance on the line based on the provided currents, wherein the controller is operative to provide an output based on the detected amount of capacitance, the output indicating whether a cable is connected to the device via the communication interface.

2. A cable detection circuit as recited in claim 1 further comprising a disconnection circuit operative to disconnect an external capacitor connected to the line at the communication interface prior to the providing of currents.

3. A cable detection circuit as recited in claim 1 wherein the line is operable to provide power to the device, and further comprising a comparator for measuring an amount of voltage on the line before the generator circuit provides the currents.

4. A cable detection circuit as recited in claim 1 wherein the generator circuit injects and sinks current on the line, and wherein the controller detects the amount of capacitance on the line by measuring a voltage on the line resulting from the injected and sinked currents.

5. A cable detection circuit as recited in claim 4 wherein the controller detects the amount of capacitance by counting a number of cycles of a periodic voltage waveform resulting from the injected and sinked currents.

6. A cable detection circuit as recited in claim 5 wherein the controller compares the number of cycles of the periodic voltage waveform to a threshold value, such that if the number of cycles is below the threshold value, a cable is considered to be connected.

7. A cable detection circuit as recited in claim 1 wherein the voltage discharger comprises a discharge circuit operative to discharge the residual voltage from the line by coupling the line to ground before the generator circuit provides the currents.

8. A cable detection circuit as recited in claim 1 further comprising an isolation circuit operative to isolate an external capacitor connected to the line at a component node of the device.

9. A cable detection circuit as recited in claim 1 further comprising an oscillator coupled to the controller to determine a time period during which the currents are provided.

10. A cable detection circuit as recited in claim 1 further comprising a input/output block coupled to a device controller of the device, the device controller operative to perform at least one function of the device and communicating signals with the controller of the cable detection circuit.

11. A cable detection circuit as recited in claim 1 wherein the communication interface is Universal Serial Bus (USB).

12. A method for detecting a cable connected to a device coupled to a communication interface, the method comprising:
removing all residual voltage present on a line of the communication interface with a voltage discharger coupled by an external switch to the line of the communication interface, wherein the voltage discharger is coupled through a first switch to a first current source to sink current from the line of the communication interface;
providing currents on the line of the communication interface using a generator circuit comprising the first current source to sink current from the line of the communication interface through the first switch and a second current source to inject current into the line of the communication interface through a second switch after removing residual voltage present on the line;
detecting an amount of capacitance on the line based on the provided currents; and
providing an output based on the detected amount of capacitance, the output indicating whether a cable is connected to the device via the communication interface.

13. A method as recited in claim 12 further comprising disconnecting an external capacitor connected to the line at the communication interface prior to the providing of currents.

14. A method as recited in claim 12 further comprising measuring an amount of voltage on the line before providing the currents, the measured voltage indicating whether a cable is connected.

15. A method as recited in claim 12 wherein the line is operable to provide power to the device, and wherein detecting the amount of capacitance on the line includes measuring a voltage resulting on the line resulting from the provided currents.

16. A method as recited in claim 15 wherein providing currents includes injecting and sinking currents on the line, and wherein detecting the amount of capacitance includes:
counting a number of cycles of a periodic voltage waveform resulting from the injected and sinked currents; and
comparing the number of cycles of the periodic voltage waveform to a threshold value, such that if the number of cycles is below the threshold value, a cable is considered to be connected.

17. A method as recited in claim 12 further comprising discharging a residual voltage from the line by grounding the line before providing the currents.

18. A method as recited in claim 12 further comprising isolating an external capacitor connected to the line at a component node of the device.

19. A method as recited in claim 13 further comprising, in response to a cable connection to the line during the detecting of the amount of capacitance on the line, re-connecting the external capacitor.

20. A method for detecting a cable connected to a device coupled to a communication interface, the method comprising:
disconnecting an external capacitor from a line of the communication interface, the line operative to provide power to the device, wherein the external capacitor is connected at a communication port of the device, the communication port facilitating communication between the device and the communication interface;

removing all residual voltage present on the line with a voltage discharger coupled by an external switch to a first current source to sink current from the line of the communication interface;

detecting an amount of capacitance on the line using a generator circuit comprising the first current source to sink current from the line of the communication interface and a second current source to inject current into the line of the communication interface after the disconnecting of the external capacitor and removing residual voltage present on the line; and providing an output based on the detected amount of capacitance, the output indicating whether a cable is connected to the device via the communication interface.

* * * * *